July 29, 1958   G. T. SEABORG ET AL   2,845,544
NEUTRON MEASURING METHOD AND APPARATUS
Filed Aug. 11, 1945
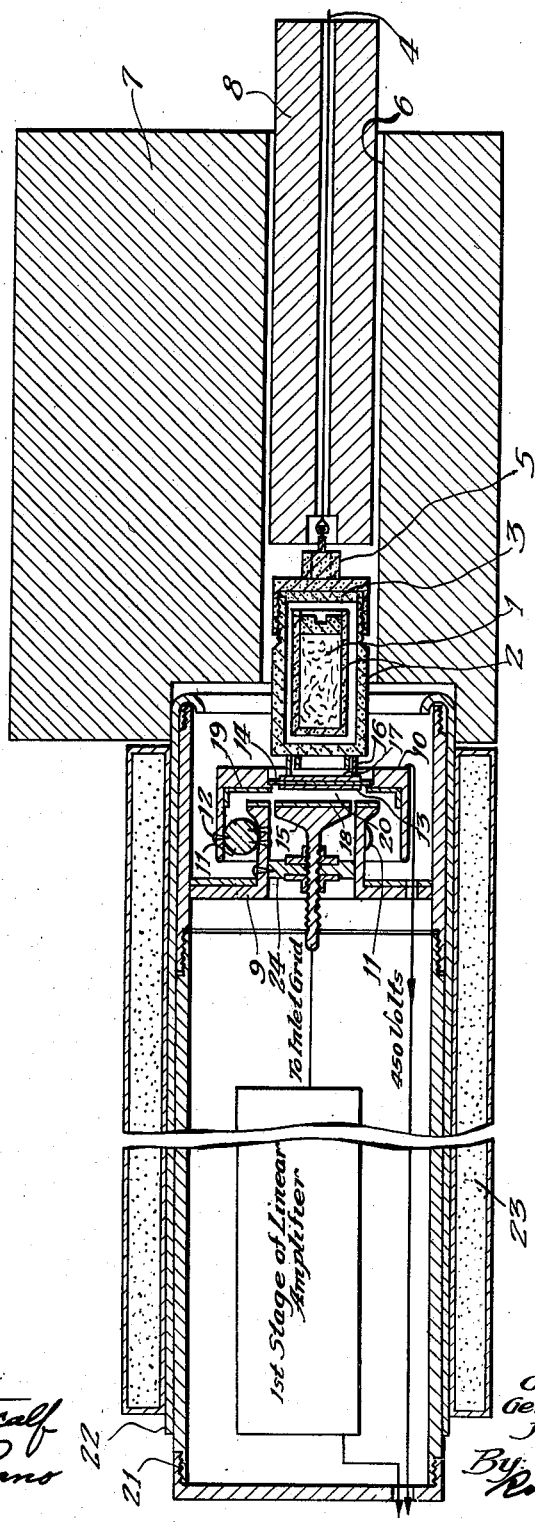
Inventors:
Glenn T. Seaborg
Gerhart Friedlander
John W. Gofman
By Robert A. Lavender
Attorney

United States Patent Office 2,845,544
Patented July 29, 1958

2,845,544

NEUTRON MEASURING METHOD AND APPARATUS

Glenn T. Seaborg, Chicago, Ill., and Gerhart Friedlander and John W. Gofman, Berkeley, Calif., assignors to the United States of America as represented by the United States Atomic Energy Commission Application August 11, 1945, Serial No. 610,348

8 Claims. (Cl. 250—83.6)

The present invention relates generally to an apparatus and method for measuring the relative fast neutron fission cross sections of samples of fissionable material. More specifically, the invention relates to a novel specific type of ion chamber for detecting pulses resulting from fission of a fissionable material bombarded by fast neutrons.

In the past, various devices and methods have been used for measuring the relative values of fast neutron fission cross section of different materials by counting the fissions induced in similar samples of the materials by a fast neutron beam. While ion chambers have been used heretofore, one outstanding difficulty in their use has been that of the tendency of the fast neutrons emitted by the source to slow down to thermal energies by colliding with neutron slowing materials before arriving at the fissionable material being bombarded. Inasmuch as fission may occur by absorption either of fast neutrons or of slow neutrons, and since isotopes such as $U^{233}$ have a relatively high slow neutron fission cross section, the presence of such slow neutrons introduces errors in the determination of the fast neutron fission cross section.

An object of our invention is to provide a novel apparatus and method for measuring relative values of fast neutron fission cross section possessing none of the above-mentioned disadvantages found in prior art apparatus and methods, namely, to provide a novel apparatus and method for effectively eliminating the presence of slow or thermal neutrons in the vicinity of the sample being bombarded by fast neutrons.

Another object of our invention is to provide a novel apparatus for measuring the relative values of fast neutron fission cross section of different materials, which apparatus is rugged, relatively inexpensive, simple in construction, highly accurate and efficient.

Other objects and advantages will become apparent from the study of the following specification taken with the drawing wherein the single figure is a longitudinal sectional view, partly in elevation, of apparatus for measuring relative values of fast neutron fission cross section of different samples, constructed in accordance with the teachings of the present invention.

Referring more particularly to the drawing, numeral 1 denotes a radium-beryllium source of fast neutrons enclosed in a double walled container 2 of corrosion resisting material, such as, for example, Monel metal. A cover 3 is provided for the outer well of container 2. A heavy wire 4 is secured to a threaded cap 5 threadedly engaging the container 2, which cap 5 may also be made of Monel metal, for the purpose of withdrawing or inserting the fast neutron source 1 and container 2 through the interior cavity 6 of a shield 7. Shield 7 and a plug 8 are made of lead or other suitable high atomic weight material to effectively shield the operator from the effects of radiation from the source 1. The clearances shown for the double walls of container 2 and between the outer wall of container 2 and the wall of cavity 6 are exaggerated for purposes of illustration.

Adjacent to the source 1 is an inverted cup-like member 10, for example of brass, having an axial aperture with an upwardly facing rabbet upon which is seated a removable electrode disc 14, for example of platinum, on the lower face of which is coated the sample 13 whose cross-section is under measurement. The member 10 is spaced from, and supported by, an annular guard ring 9, by a plurality of insulators 11 which are constructed of any material having good insulating characteristics which is adapted to receive screw threads. A minimum number of insulators 11, preferably three, is used in order to minimize their tendency to slow down fast neutrons because of their hydrogenous content or other moderating material. The insulators 11 are constructed of insulating material which is readily adaptable to receive screws, so that screws 12 may be used to secure the member 10 to the insulators 11 and to secure the insulators 11 to the guard ring 9, as shown in the drawing. Quartz may be used as the insulating material but is less desirable than some other insulating materials because of its tendency to chip when screws 12 are threadedly secured therein. A high potential such as, for example, 450 volts, is applied to the electrode 14 through the conducting member 10, whereas a collecting electrode 15, insulatingly supported by an insulator 24, constructed of insulating material similar to that used for insulators 11, is connected to the input grid of an electrometer type of tube, such as, for example, a type 959 tube (not shown). Alternatively (but not as illustrated) the electrode 14 may be at ground potential and the collecting electrode 15 at −450 volts which will permit bringing container 2 in substantially adjacent relationship with electrode 14. A ring or spacer 16 of glass or other suitable insulating material is provided between container 2 and electrode 14 in order to insulate electrode 14 from the structure associated with container 2. Except for this spacing, container 2 of the source 1 is placed as closely as possible to sample 13 so that the fast neutrons emitted will have no opportunity to be slowed down before reaching sample 13. To further insure the absence of thermal neutrons in the vicinity of the sample 13 being bombarded by fast neutrons, a thin disc 17 of cadmium or other suitable thermal neutron absorbing material is interposed between source 1 and the upper surface of electrode 14. Electrodes 14 and 15 are arranged close together in confronting relationship so as to provide a very shallow ion chamber 20 having air as the ionizing medium thereof. Inasmuch as the range of fission fragments in air is between 2 and 3 centimeters, it is highly desirable to make the inter-electrode spacing less than 2 centimeters and preferably between ½ to 1 centimeter. An additional reason for such close spacing of the electrodes is to reduce the required potential difference between electrodes necessary for giving a suitable voltage gradient for obtaining detectable ion pulses. When the sample 13 is bombarded by fast neutrons, fission occurs. For instance, $U^{235}$ breaks into nuclei of medium mass and charge, such as strontium and barium, with the release of a high amount of energy, resulting in the ionization of the air in the ion chamber. The oxygen and nitrogen ions formed by such ionization of the air in the ion chamber are collected by electrode 15 and induces an electric current which is amplified by any suitable well known pulse amplifier (shown in block diagram form) and recorded by any suitable well-known recording system to record impulses due to fissions (not shown). The specific amplifier and recorder circuits form no part of the present invention.

In order to further eliminate or minimize the presence of slow neutrons in the interior of the ion chamber, a lining 18, 19 of material having high neutron capture capabilities for thermal neutrons such as, for example, cadmium, is provided on the interior surface of the ion chamber so as to absorb slow neutrons of thermal energy and prevent their diffusing back to the sample. The ion chamber input grid of the amplifier tube (not shown) to which electrode 15 is connected as well as the entire first stage of a 4-stage linear amplifier, for example (shown in block diagram form), are enclosed in an electrostatic shield 21 of brass or other suitable material. In order to minimize the possibility of entry of slow neutrons through shield 21, which neutrons might be slowed down by hydrogen-containing matter exterior to the device, such as air, and return by diffusion, there is provided a shield 22 of cadmium or other suitable high thermal neutron capture capability material, preferably backed by a second shield 23 of boron carbide or the like. Neutrons at thermal energies, that is about .03 electron volt, are readily absorbed by cadmium; however, at higher energies cadmium is less effective for absorbing neutrons. On the other hand, boron in relation to cadmium is a relatively poor absorber of thermal neutrons but is a very efficient absorber of neutrons above thermal energy particularly up to .1 to 1 volt or perhaps higher. Therefore, by combining the cadmium and boron carbide a fairly high range of slow neutrons will be effectively absorbed.

A modified mounting for the container 2 carrying the fast neutron source 1 contemplates a threaded collar member threadedly engaging the aperture of the member 10. In this modification, collar member supports an internal glass collar which in turn supports the container 2.

The ion chamber is placed on a table (not shown) preferably of steel or other material devoid of hydrogenous or other neutron slowing material.

The following table gives the results obtained from various samples of fissionable materials using the device illustrated and described:

RELATIVE FAST NEUTRON (Ra-Be) FISSION CROSS-SECTIONS

| Sample | Isotope | Weight in μg. | Fission rate (counts/hr.) | Fission Rate per μg. (counts/hr.) | Relative cross-section |
|---|---|---|---|---|---|
| I | $94^{239}$ | 1.15 | 11.4±0.41 | 9.90±0.35 | 1.93 |
| II | $94^{239}$ | 1.15 | 11.2±0.38 | 9.74±0.33 | 1.90 |
| III | $U^{233}$ | 0.8 | 8.34±0.43 | 10.4±0.54 | 2.04 |
| IV | $U^{233}$ | 3.8 | 38.7±1.7 | 10.2±0.45 | 2.00 |
| V | $U^{235}$ | 18.5 | 94.5±1.2 | 5.11±0.07 | 1. |
| VI | $U^{238}$ | 188.6 | 384±2.1 | 2.01±0.01 | 0.39 |
| VII | $Pa^{231}$ | 17.9 | 69.7±2.4 | 3.89±0.13 | 0.76 |
| VIII | $Pa^{231}$ | 6.6 | 24.3±0.9 | 3.68±0.14 | 0.72 |

It should be noted that the relative cross sections for $U^{238}$ and $Pa^{231}$ are not reliable for fast neutrons from other sources since only a small fraction of radium-beryllium neutrons have an energy above the energy threshold for the fission of these isotopes. The nucleus $Pa^{231}$ is included in these measurements, principally because this nucleus, like $U^{238}$, does not undergo fission with thermal neutrons but has an energy threshold for fission much nearer the thermal region than that of $U^{238}$. The weights of the samples are determined in a well known way, that is by counting their emitted alpha particles with calibrated ionization chambers. The errors in determining such weights consists of two parts: (1) the error in the determination of the alpha disintegration rate and (2) the error in determining the half-lives of the isotopes. The error under (1) probably does not exceed 2 to 3 percent whereas the error under (2) involving the half-life of 24,300 years of $94^{239}$ and half-life of 162,000 years of $U^{233}$ may be in the neighborhood of 10 to 15 percent. Another source of error is the possibility of slight impurities in the samples such as natural uranium or thorium. Still another source of error arises from the possibility that stray slow neutrons might leak through to the sample in spite of the shielding with cadmium and boron. However, the fission counting rate due to any such slow neutrons was shown to be practically negligible compared with the fission counting rate due to fast neutrons by surrounding the apparatus shown in Fig. 1 with a large amount of paraffin which did not increase the counting rate by a detectable amount. A further source of error is the self absorption of the fission fragments in the samples.

It is possible to estimate absolute cross sections from the measured data provided the number of neutrons per second striking one of the samples is known. In order to make such a determination a 190 microgram $U^{238}$ sample was used and the neutron source was moved back to a position where the fraction of the solid angle subtended by the sample could be estimated and the fission counting rate determined. The total number of neutrons emitted by the source 1 comprising 1 gram of radium mixed with 5 grams of beryllium was considered to be 12,000,000 per second. From these data the fast fission cross section for $U^{238}$ was calculated and then from the relative counts recorded, which correspond to relative fast fission cross sections, the absolute fast fission cross sections of the other isotopes were calculated.

It will be seen, therefore, that there has been provided an efficient apparatus and method for determining the relative fast neutron fission cross sections of various materials which have effectively eliminated the presence of slow neutrons in the vicinity of the sample being bombarded by a fast neutron beam thereby giving accurate results. Furthermore, there is provided an ionization chamber in which an extremely thin sample of a substance under measurement may be coated on a readily removable electrode, thus maximizing the emission of ionizing particles into the inter-electrode space and at the same time not requiring that the chamber be disassembled for removal and insertion of samples.

It will be apparent that modifications of the apparatus and method described herein may be suggested to others skilled in the art after having had the benefit of the teachings of the present invention. The present invention is not to be restricted except insofar as set forth in the following claims.

What is claimed is:

1. Fast neutron fission detecting apparatus having, in combination, an ion chamber containing air and provided with an aperture on one wall thereof, a pair of electrodes in said chamber in confronting relationship, one of said electrodes being mounted in the orifice and being coated with a sample of fissionable material on its surface confronting the other electrode, the walls of said ion chamber including the surface exterior of said coated electrode being coated with a thin layer of material having a high absorption characteristic for thermal neutrons, a source of fast neutrons exteriorly of said ion chamber immediately adjacent to the orifice and said coated electrode, amplifying means adjacent the ion chamber in circuit relationship with the other of said electrodes and a shield surrounding said amplifying means and ion chamber of material having a high absorption characteristic for neutrons in a range from thermal energy to about 1 electron volt.

2. Fast neutron fission detecting apparatus having, in combination, an ion chamber containing air, a pair of electrodes in said chamber in confronting relationship and less than 2 centimeters apart, the active surface of one of said electrodes being coated with a sample of fissionable material, the walls of said ion chamber including the surface exterior of said coated electrode being coated with a thin layer of material having a high absorption characteristic for thermal neutrons, a source of fast neutrons exteriorly of said ion chamber immediately behind said exterior surface adjacent said coated electrode, amplifying means adjacent the ion chamber in circuit relationship with the other of said electrodes, and a composite shield of cadmium and boron carbide surrounding said amplifying means and ion chamber.

3. Fast neutron fission detecting apparatus comprising the elements of claim 1 wherein the source of fast neutrons comprises a radium-beryllium source.

4. Fast neutron fission detecting apparatus having, in combination, an ion chamber containing air, a pair of electrodes in said chamber in confronting relationship and less than 2 centimeters apart, the active surface of one of said electrodes being coated with a sample of fissionable material, and having a high potential applied thereto, amplifying means adjacent the ion chamber connected to the other of said electrodes, a radium-beryllium source exteriorly of said ion chamber immediately adjacent said coated electrode, said ion chamber having a thin coating of material having a high absorption characteristic for thermal neutrons exterior of said chamber including a coating portion intermediate said coated electrode and said source, and a thermal neutron shield surrounding said ion chamber and said amplifying means.

5. Fast neutron fission detecting apparatus having, in combination, an ion chamber containing air, a pair of electrodes in said chamber in confronting relationship and less than 2 centimeters apart, the active surface of one of said electrodes being coated with a sample of fissionable material, and having a high potential applied thereto, amplifying means adjacent the ion chamber connected to the other of said electrodes, a radium-beryllium source exteriorly of said ion chamber immediately adjacent said coated electrode, said ion chamber having a thin coating of material having a high absorption characteristic for thermal neutrons exterior of said chamber including a coating portion intermediate said coated electrode and said source and a shield comprising a layer of cadmium and a layer of boron carbide surrounding said ion chamber and said amplifying means.

6. An ionization chamber comprising, in combination: a tubular conducting housing; a first disc electrode within said housing having a plane surface transverse of the housing; a conducting plate having an inner surface facing said plane surface of the first electrode, said plate having an axial aperture therethrough opposite the first electrode and having on the outer surface thereof an annular rabbet appurtenant to the aperture and adapted to receive a second conducting disc electrode; a second conducting disc electrode seated upon said rabbet and having the inwardly facing surface thereof coated with a sample of a material giving off ionizing particles, said electrodes having therebetween a gap containing air; and insulating supports supporting the first electrode and the plate.

7. An ionization chamber comprising, in combination: a conducting housing; a first electrode within said housing having a plane surface transverse of the housing; a conducting plate having two surfaces, including an inner surface facing said plane surface of the first electrode, said plate having an aperture therethrough opposite the first electrode and having on the outer surface thereof a rabbet appurtenant to the aperture and adapted to receive a second conducting electrode; a second conducting electrode seated upon said rabbet and having the inner surface thereof coated with a sample of a material giving off ionizing particles, said electrodes having therebetween a gap containing air; and insulating supports supporting the first electrode and the plate.

8. Fast neutron fission detecting apparatus having, in combination, an ion chamber containing air and provided with an orifice, a first electrode positioned within the orifice adapted to be coated with a fissionable material, a second electrode mounted within the chamber in confronting relationship with the first electrode, a lining of material absorbing thermal neutrons within the chamber, said lining covering the confronting surfaces of the two electrodes, a source of fast neutrons disposed exterior to the ion chamber and immediately adjacent to the orifice therein, and means to detect ionization currents within the chamber connected to the electrodes.

References Cited in the file of this patent
UNITED STATES PATENTS

| | | |
|---|---|---|
| 2,161,985 | Szilard | June 13, 1939 |
| 2,206,634 | Fermi et al. | July 2, 1940 |
| 2,220,509 | Brons | Nov. 5, 1940 |
| 2,303,688 | Fearon | Dec. 1, 1942 |
| 2,334,262 | Hare | Nov. 16, 1943 |
| 2,390,433 | Fearon | Dec. 4, 1945 |
| 2,408,230 | Shoupp | Sept. 24, 1946 |